July 9, 1929.  H. E. SIPE  1,719,856
FASTENING DEVICE
Filed July 18, 1927
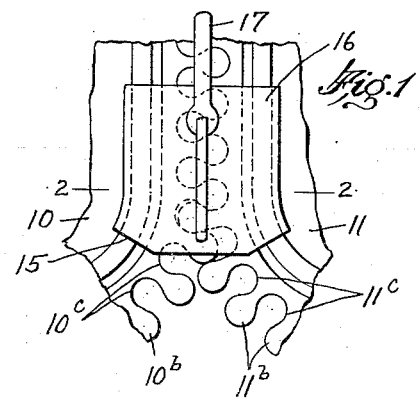
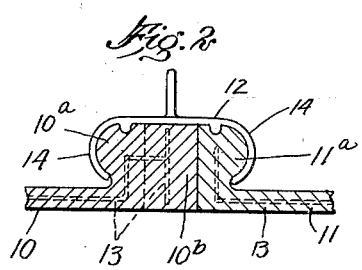
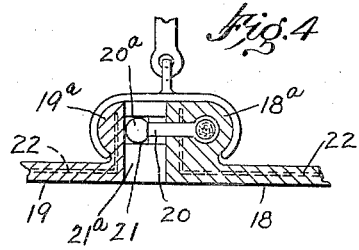
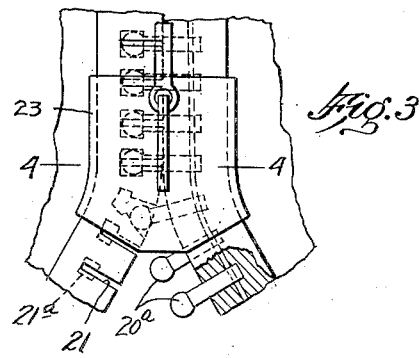
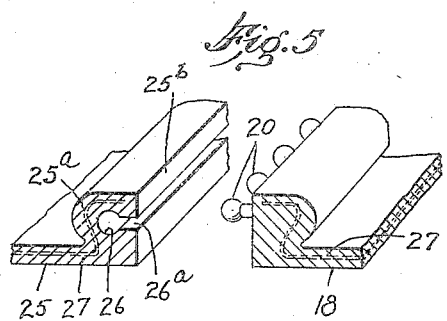
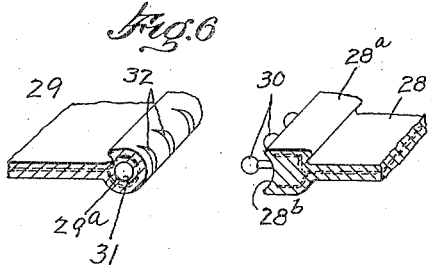
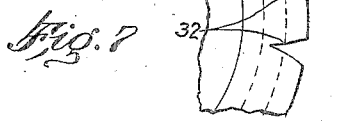
INVENTOR
Harry E. Sipe
BY
ATTORNEY Patented July 9, 1929.

1,719,856

UNITED STATES PATENT OFFICE.

HARRY E. SIPE, OF NEW YORK, N. Y.

FASTENING DEVICE.

Application filed July 18, 1927. Serial No. 206,419.

This invention relates to fastening devices, and particularly to devices of this class for use in coupling and uncoupling separate parts of a garment or apparel or separable parts of containers and like devices; and the object of the invention is to provide a device of the class described, the separate members or parts of which are primarily constructed of flexible and readily yieldable material, such for example as rubber or composition rubber, said parts having reinforcing and strengthening material to give the desired strength and durability to the device; a further object being to provide a coupling or fastener of the class described employing knob and socket members adapted to interlock or intermesh in coupling the separate parts or members together, with means in the form of a slider movable longitudinally of said parts for coupling and uncoupling the same; a further object being to provide a device wherein each of the parts are provided with spaced knob and socket portions, the knob portions of one part being adapted to enter the socket portions of the other part in coupling said parts together; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a part of a fastening device made according to my invention and indicating the method of coupling and uncoupling the separate parts of the device.

Fig. 2 is a section on the line 2—2 of Fig. 1.

Fig. 3 is a view similar to Fig. 1 but showing a modified form of structure.

Fig. 4 is a section on the line 4—4 of Fig. 3.

Fig. 5 is a perspective detail view of the separate parts of another form of fastening device which I employ.

Fig. 6 is a view similar to Fig. 5 but showing another form of fastener; and,

Fig. 7 is a detail, plan view of a part of the construction shown in Fig. 6.

In the construction shown in Figs. 1 and 2 of the drawing, I employ two parts or members 10 and 11, which may be attached to or constitute part of the garment, apparel or device in connection with which the fastener is employed. Both of said parts or the interlocking raised portions $10^a$ and $11^a$ thereof are of similar construction, the outer faces being rounded to permit of the movement of a slider 12 longitudinally thereof, and the inner and adjacent faces having spaced cylindrical knobs or projections $10^b$ and $11^b$ between which are circular or semi-circular sockets or recesses $10^c$ and $11^c$. The knobs $10^b$ of the part 10 are adapted to enter the sockets $11^c$ of the part 11, and in like manner, the members $11^b$ are adapted to enter the sockets $10^c$. When said parts are coupled together, the lateral displacement or uncoupling of said parts is prevented. The projecting members $10^b$—$11^b$ as well as the parts $10^a$—$11^a$ and 10 and 11 may be reinforced and strengthened by fabric or metal reinforcement 13 to give strength and durability to the rubber or composition rubber employed in the construction of the separate parts, and operates to prevent tearing or rupture to the neck portions of the members $10^b$ and $11^b$, when subjected to lateral stress.

The slide member 12 is provided with curved side flanges 14 which encircle the rounded side edges of the parts $10^a$ and $11^a$ as clearly seen in Fig. 2 of the drawing, and thus retain the slider in connection with the separate parts. The flared end 15 of the slider permits of the free passage of the parts 10 and 11 thereinto, and the interlocking of said parts in their passage through the contracted end 16 of the slider. A suitable finger piece 17 is employed for moving the slider longitudinally of the parts 10 and 11 in the operation of coupling and uncoupling the same.

In Figs. 3 and 4 of the drawing, I have shown a modification wherein two parts 18 and 19 having raised body portions $18^a$ and $19^a$ are coupled together and interlocked by spaced pin members 20 mounted in and secured to the part 18 at spaced intervals. Socket members 21 are formed in the part 19 at spaced intervals to correspond with the spacing of the pins 20 in the part 18. The sockets open upwardly and downwardly the part 19 in slots $21^a$ which also open outwardly through the outer edge of said part or the edge adjacent the part 18, permitting the free insertion of the pin members into the sockets 21, said pin members being preferably provided with rounded heads $20^a$.

In this construction, the parts 18 and 19 are also provided with reinforcing material 22, and if desired the pin members 20 may be anchored to this reinforcing material, especially if constructed of fibre or metal, it being understood, however, that the members 20 may be composed of rubber and constitute an integral part of the member 18. However, metallic, fibrous or other hard and rigid pin members are preferred. A slider 23, similar to the slider 12, is employed for coupling and uncoupling the parts 18 and 19, the flared end 24 of the slider facilitating the insertion of the pin members 20 into the sockets 21.

In Fig. 5 of the drawing, I have shown a slight modification of the structure shown in Figs. 3 and 4, wherein the part 18 is identical with the part 18 shown in Figs. 3 and 4, and the part 25 is substituted for the part 19. The part 25 differs from the part 19 in that a continuous socket 26 extends longitudinally of the raised portion 25$^a$ thereof, and opens outwardly through its outer edge in a narrow slot 26$^a$. With this construction, a suitable slider will be employed to couple and uncouple the parts 18 and 25 to permit of the passage of the pins 20 into the sockets 26 and to raise the rib or flange portion 25$^b$ of the part 25$^a$ to facilitate this operation. In this construction, the parts 18 and 25 are reinforced as indicated at 27.

In Figs. 6 and 7 of the drawing, I have shown another modification, wherein two parts 28 and 29 are employed, the part 28 having an enlarged edge portion 28a having a concaved recess 28$^b$ in its outer face. Centrally of said face and extending longitudinally thereof are spaced headed pin members 30 formed integral with or secured to the part 28. The part 29 is provided with an enlarged portion 29$^a$ substantially circular in cross sectional form and adapted to seat in the concave recess 28$^b$ when the parts are coupled together. The enlargement 29$^a$ has a bore or passage 31 extending longitudinally therethrough, and the outer edge of said enlargement is slotted at spaced intervals as seen at 32 to correspond with the spacing of the pins 30. The slots flare at their outer ends as seen at 33, Fig. 7 to permit of the free passage of the heads of the pins into the socket formed by the bore or passage 31 extending through the enlargement 29$^a$ and arranged at the slotted portions thereof. A slider similar to that shown in Figs. 2 and 4 of the drawing may be employed for coupling and uncoupling the parts 28 and 29 or any other suitable slider may be used, it being understood that my invention is not necessarily limited to any particular type of slider employed for coupling and uncoupling the parts.

From the foregoing, it will be understood that the distinctive feature of my invention resides in the provision of two parts or members of a fastening device, the major portion of the body of which is composed of rubber or other flexible and yieldable material, and the provision of projecting members or sockets on one or both of said parts adapted to couple the parts together by placing the pin members of one part in the sockets of the other part by the use of a suitable slider, and in coupling and uncoupling said parts. While I have shown certain details of construction for carrying my invention into effect, it will be understood that I am not necessarily limited to these details, and various changes in and modifications of the construction herein shown and described, may be made within the scope of the appended claims, without departing from the spirit of my invention or sacrificing its advantages.

Having fully described my invention, what I claim as new and desire to secure by Letters Patent, is:—

1. A fastener of the class described comprising two elongated parts composed of resilient material, said parts having spaced and interlocking projecting members and sockets formed of said resilient material, for coupling said parts together, and means slidably engaging said parts for coupling and uncoupling the same.

2. A fastener device of the class described comprising separate parts adapted to be coupled and uncoupled, and one of said parts consisting of a body of flexible material having projecting members spaced longitudinally of one edge portion thereof, and the other of said parts being composed of flexible material and provided with sockets formed of the material of said part into which the projecting members on the other part are adapted to be placed, and said projecting members and sockets interlocking with each other in coupling said parts together.

3. A fastening device of the class described comprising two elongated bodies of rubber, said bodies having spaced, interlocking members, constituting an integral part thereof and adapted to be brought together and interlocked in coupling said parts against separation, and a slider slidably engaging said parts for coupling and uncoupling the same.

4. In a fastening device of the class described consisting of separate parts adapted to be coupled together, each of said parts consisting of an elongated body of reinforced rubber, and a plurality of projecting members spaced longitudinally of one edge portion of said body and the projecting members of the separate parts of the device interlocking in coupling said parts together.

5. In a fastening device of the class described consisting of separate parts adapted to be coupled together, each of said parts consisting of an elongated body of reinforced rubber, and a plurality of projecting members spaced longitudinally of one edge portion of said body, and the projecting members of the separate parts of the device interlocking in coupling said parts together, said members being composed of reinforced rubber.

6. A fastening device of the class described comprising separate parts adapted to be coupled and uncoupled, each of said parts being composed of flexible material and having projecting portions integral therewith, the projecting portions of one part interlocking with those of the other part, cooperative means on the projecting portions of the separate parts for preventing the separation of said parts when coupled together, and a slide member slidably engaging said parts for coupling and uncoupling the same.

7. A fastening device of the class described comprising separate parts adapted to be coupled and uncoupled, each of said parts being composed of flexible material and having projecting portions integral therewith, the projecting portions of one part interlocking with those of the other part, cooperative means on the projecting portions of the separate parts for preventing the separation of said parts when coupled together, a slide member slidably engaging said parts for coupling and uncoupling the same, and means on said parts and slide member for keying the slide member thereto and for guiding the same in its movement longitudinally thereof.

8. A fastening device of the class described comprising separate parts adapted to be coupled and uncoupled, each of said parts being composed of flexible material and having projecting portions integral therewith, the projecting portions of one part interlocking with those of the other part, cooperative means on the projecting portions of the separate parts for preventing the separation of said parts when coupled together, a slide member slidably engaging said parts for coupling and uncoupling the same, means on said parts and slide member for keying the slide member thereto and for guiding the same in its movement longitudinally thereof, and means for reinforcing each of said parts.

9. A fastener device of the class described comprising two elongated parts composed of resilient material, said parts having spaced and interlocking projecting members and sockets formed of said resilient material for coupling said parts together, and the projecting members interlocking with each other due to the inherent flexibility of the material other than that from which the interlocking members are formed.

10. A fastening device of the class described comprising two elongated bodies of rubber, said bodies having spaced interlocking members constituting an integral part thereof and adapted to be brought together and interlocked in coupling said parts against separation, and the projecting members interlocking with each other due to the inherent flexibility of the material other than that from which the interlocking members are formed.

11. A fastening device of the class described comprising separate parts adapted to be coupled and uncoupled, each of said parts being composed of flexible material and having projecting portions integral therewith, the projecting portions of one part interlocking with those of the other part, cooperative means on the projecting portions of the separate parts for preventing the separation of said parts when coupled together, and the projecting members interlocking with each other due to the inherent flexibility of the material other than that from which the interlocking members are formed.

12. A fastening device of the class described comprising two parts having knob and socket portions, spaced longitudinally of said parts, and the major portion of said parts including the knob and socket portions being composed of reinforced rubber.

In testimony that I claim the foregoing as my invention I have signed my name this 11th day of July, 1927.

HARRY E. SIPE.